US008626622B2

(12) United States Patent
Subramaniam et al.

(10) Patent No.: US 8,626,622 B2
(45) Date of Patent: Jan. 7, 2014

(54) SYSTEM AND METHODS FOR ELECTRONIC SIGNATURE CAPTURE IN E-CONTRACTING TRANSACTIONS

(75) Inventors: Taruvai N. Subramaniam, Troy, MI (US); Mark Leonard, Ypsilanti, MI (US)

(73) Assignee: RouteOne LLC, Farmington Hills, MI (US)

( * ) Notice: Subject to any disclaimer, the term of this patent is extended or adjusted under 35 U.S.C. 154(b) by 555 days.

(21) Appl. No.: 12/041,010

(22) Filed: Mar. 3, 2008

(65) Prior Publication Data
US 2009/0157538 A1    Jun. 18, 2009

Related U.S. Application Data

(63) Continuation-in-part of application No. 12/002,016, filed on Dec. 14, 2007, now abandoned.

(51) Int. Cl.
*G06Q 40/00* (2012.01)
(52) U.S. Cl.
USPC .............................................. 705/35; 705/38
(58) Field of Classification Search
USPC ..................................................... 705/35, 38
See application file for complete search history.

(56) References Cited

U.S. PATENT DOCUMENTS

| | | | |
|---|---|---|---|
| 5,878,403 A | 3/1999 | DeFrancesco et al. | |
| 6,092,121 A | 7/2000 | Bennett et al. | |
| 6,208,979 B1 | 3/2001 | Sinclair | |
| 6,250,549 B1 * | 6/2001 | DeFabio, Jr. | 235/380 |
| 6,339,775 B1 | 1/2002 | Zamanian et al. | |
| 6,587,841 B1 | 7/2003 | DeFrancesco et al. | |
| 6,745,936 B1 | 6/2004 | Movalli et al. | |
| 6,782,375 B2 | 8/2004 | Abdel-Moneim et al. | |
| 6,907,529 B1 * | 6/2005 | Hirose | 726/5 |

(Continued)

FOREIGN PATENT DOCUMENTS

| | | |
|---|---|---|
| CA | 2304293 A1 | 9/2000 |
| WO | WO 02/065351 A1 | 8/2002 |
| WO | 2005010731 A2 | 2/2005 |
| WO | 2006010737 A2 | 2/2006 |

OTHER PUBLICATIONS

International Search Report for International Application No. PCT/US08/54089, mailed Dec. 16, 2009.

(Continued)

*Primary Examiner* — Thomas M Hammond, III
*Assistant Examiner* — John Scarito
(74) *Attorney, Agent, or Firm* — Nixon Peabody LLP; David B. Ritchie

(57) ABSTRACT

A system and method for generating, executing and maintaining electronic contracts in connection with indirect financing transactions involving an acquisition by a customer of an asset offered by a vendor with financing provided by an independent finance source. In one example embodiment, the system includes en e-contracting component configured to generate an electronic contract having one or more signature fields. The contract further includes a contract identifier and one or more signature identifiers embedded therein. The e-contracting component provides the generated electronic contract to one more contracting parties, including the customer, the vendor and the finance sources. The system further includes a holographic signature capture device configured to capture one or more holographic signatures indicating execution of the contract by the contracting parties. The capture device if further configured to transmit the captured signature information to the e-contracting component.

13 Claims, 6 Drawing Sheets

(56) References Cited

U.S. PATENT DOCUMENTS

| | | | |
|---|---|---|---|
| 7,027,623 B2* | 4/2006 | McWilliam et al. | 382/119 |
| 7,069,234 B1 | 6/2006 | Cornelius et al. | |
| 7,103,573 B2 | 9/2006 | Mobed et al. | |
| 7,143,290 B1 | 11/2006 | Ginter et al. | |
| 7,249,322 B2 | 7/2007 | Jones et al. | |
| 2001/0002485 A1 | 5/2001 | Bisbee et al. | |
| 2002/0147663 A1 | 10/2002 | Walker et al. | |
| 2002/0152086 A1 | 10/2002 | Smith et al. | |
| 2002/0198819 A1 | 12/2002 | Munoz et al. | |
| 2003/0012374 A1* | 1/2003 | Wu et al. | 380/44 |
| 2003/0032476 A1 | 2/2003 | Walker et al. | |
| 2003/0055727 A1 | 3/2003 | Walker et al. | |
| 2003/0062998 A1 | 4/2003 | Rubenstein | |
| 2003/0182247 A1 | 9/2003 | Mobed et al. | |
| 2003/0236740 A1 | 12/2003 | Lang et al. | |
| 2004/0199407 A1 | 10/2004 | Prendergast | |
| 2004/0216031 A1* | 10/2004 | Taylor | 715/500 |
| 2004/0226002 A1 | 11/2004 | Larcheveque et al. | |
| 2005/0086176 A1 | 4/2005 | Dahlgren et al. | |
| 2005/0108129 A1 | 5/2005 | Seibert et al. | |
| 2005/0171901 A1 | 8/2005 | Rosenblatt et al. | |
| 2005/0278249 A1 | 12/2005 | Jones et al. | |
| 2005/0283435 A1 | 12/2005 | Mobed et al. | |
| 2006/0209044 A1* | 9/2006 | Cohen et al. | 345/173 |
| 2006/0277123 A1* | 12/2006 | Kennedy et al. | 705/35 |
| 2007/0011083 A1 | 1/2007 | Bird et al. | |
| 2007/0028079 A1 | 2/2007 | Weinberg et al. | |
| 2007/0112670 A1 | 5/2007 | DeFrancesco et al. | |
| 2007/0272738 A1 | 11/2007 | Berkun | |
| 2008/0067256 A1 | 3/2008 | Shernaman | |
| 2008/0166993 A1 | 7/2008 | Gautier et al. | |
| 2008/0203153 A1 | 8/2008 | Keithley et al. | |
| 2008/0235577 A1* | 9/2008 | Veluchamy et al. | 715/268 |

OTHER PUBLICATIONS

"DealerTrack Announces Integration of eContracting Product With First American CMSI's Origenate and CreditRevue," dated Mar. 15, 2004, Atlanta, GA.

International Search Report and Written Opinion for International Application No. PCT/US07/77328, mailed Jan. 28, 2008.

International Search Report and Written Opinion for International Application No. PCT/US08/55673, mailed Jul. 28, 2008.

International Search Report and Written Opinion for International Application No. PCT/US08/81482, mailed Jan. 5, 2009.

International Search Report and Written Opinion for International Application No. PCT/US09/35770, mailed Apr. 30, 2009.

Examination Report in Australian Patent Application No. 2008232997, dated Dec. 9, 2011.

Examination Report in New Zealand Patent Application No. 586128, dated Nov. 25, 2011.

First Office Action in Chinese Patent Application No. 200880120971.2, dated Jul. 13, 2011.

Second Office Action in Chinese Patent Application No. 200780100958.6, dated Feb. 20, 2012.

Canadian Office Action in Canadian Application No. 2,695,723, mailed Apr. 3, 2012.

Office Action for Mexican Application No. MX/a/2010/001529 dated May 18, 2012.

First Office Action for Chinese Application No. 200880018265.7 dated Jul. 14, 2011.

Second Office Action for Chinese Application No. 200880018265.7 dated Jul. 25, 2012.

Decision on Rejection for Chinese Application No. 200880018265.7 dated Jan. 17, 2013.

Second Office Action for Chinese Application No. 200880120971.2 dated Jul. 27, 2012.

Third Office Action for Chinese Application No. 200780100958.6 dated Aug. 2, 2012.

Supplementary European Search Report for European Application No. 08731261.7 dated Jul. 11, 2012.

Examination Report for New Zealand Application No. 602829 dated Oct. 9, 2012.

Further Examination Report for New Zealand Application No. 586128 dated Jan. 15, 2013.

Examination Report No. 2 for Australian Application No. 2008232997 dated Dec. 13, 2012.

Francois Guimbretiere, "Paper Augmented Digital Documents," Proceedings of UIST'03, Nov. 2, 2003, pp. 51-60.

Canadian Office Action in Canadian Application No. 2,710,208, dated May 27, 2013.

Chinese Office Action in Chinese Application No. 200880120971.2, dated Apr. 2, 2013.

Mexican Office Action in Mexican Application No. MX/a/2010/006349, dated Mar. 25, 2013.

Mexican Office Action in Mexican Application No. MX/a/2009/010584, dated May 28, 2013.

\* cited by examiner

SYSTEM AND METHODS FOR ELECTRONIC SIGNATURE CAPTURE IN E-CONTRACTING TRANSACTIONS

CROSS-REFERENCE TO RELATED APPLICATIONS

The present application is a continuation-in-part of U.S. patent application Ser. No. 12/002,016, filed on Dec. 14, 2007, which is incorporated by reference herein in its entirety.

FIELD OF THE INVENTION

The present invention relates generally to a system and method for electronic contracting, and more particularly, electronic contracting in indirect financing transactions.

BACKGROUND

In the past, the process for generating, assigning, discounting and funding contracts in indirect financing transactions, such as automobile financing and other consumer credit transactions, was driven by the completion and processing of pre-printed paper forms. A dealer would complete the required pre-printed forms, enter into the contract with the customer, assign the contract and related documents to the finance source, e.g., a bank or other financing company, and then physically bundle and deliver the paper contract package (via courier or mail) to the finance source's sales branch. Once the documents were received, the sales branch would manually enter the required data from the contract packages into a computer system. Once data and plan validation were complete, and any remaining issues were resolved, the contract would be released for funding. After the contract was funded, the sales branch would then re-bundle the contract package and forward it to another application or supplier to scan or image the paper contract for account servicing purposes.

Recent advances in the computer and telecommunication technologies, however, have had a significant impact on the way financing transactions are conducted. For example, electronic exchange of information, including faxing, emailing, and the like, between dealership finance and insurance staff has enabled dealers to electronically initiate financing transactions for their customers with various independent finance sources, thereby enhancing both the efficiency and accuracy associated with securing consumer financing. However, current e-contracting solutions are only partially automated due to security concerns and lack of integration and cooperation between dealerships and various finance sources. Accordingly, there is a need for an improved e-contracting system that facilitates electronic contract creation, execution and storage and makes available the contracts and related information to dealers and various finance sources in a secure and reliable manner.

OVERVIEW

Computer-implemented systems and methods for electronic contracting in indirect financing transactions described herein provide an improved e-contracting environment in which a customer may acquire an asset (such as, for example, an automobile) from a dealer or other vendor with financing for the transaction provided by an independent finance source.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DETAILED DESCRIPTION OF EXAMPLE EMBODIMENTS

Figure 1:
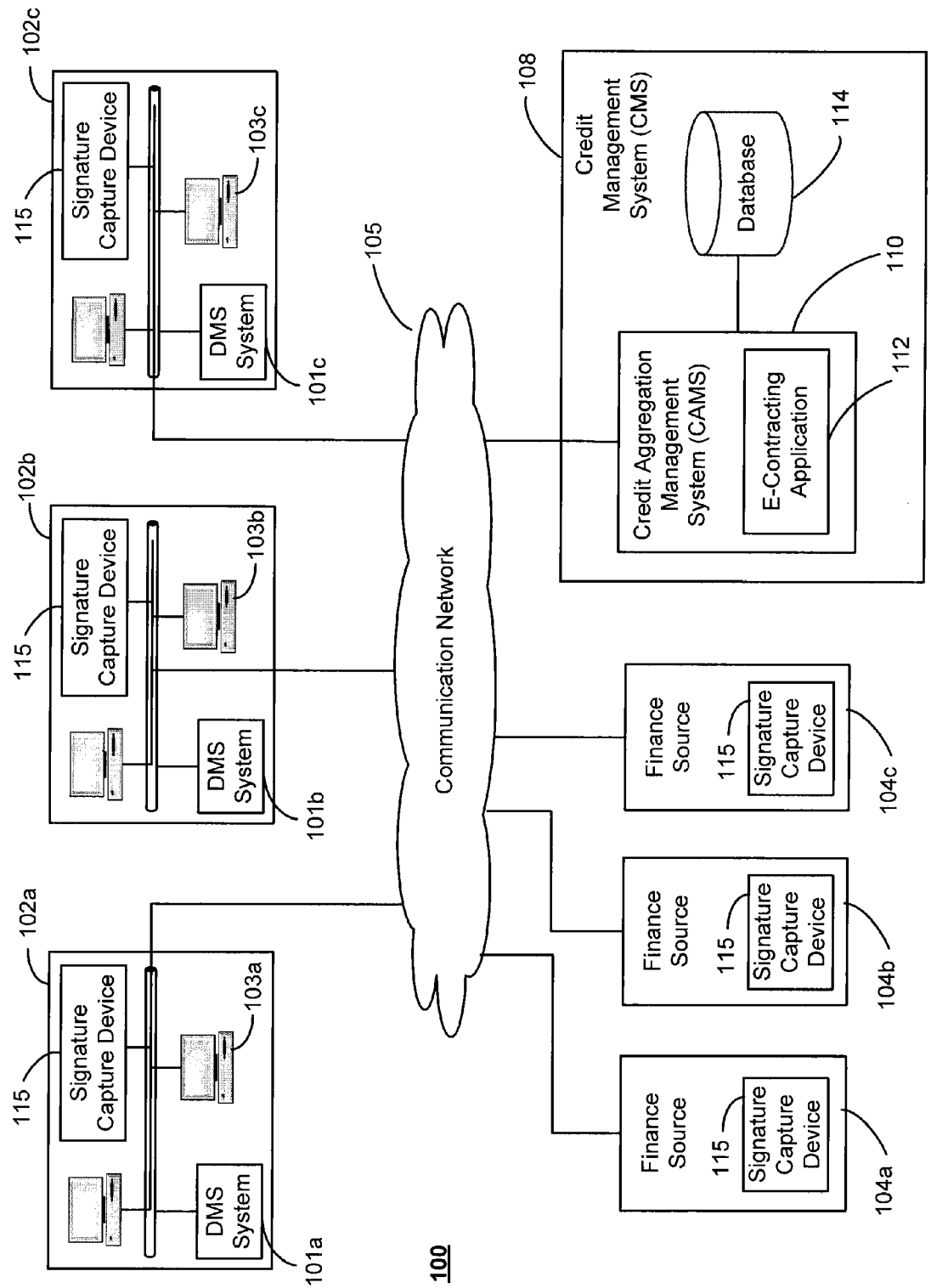
FIG. 1 is a schematic diagram illustrating one example embodiment of a system for implementing financing transactions in connection with an acquisition of an asset such as an automobile.

Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

As will be understood, for purposes of clarity of exposition, the illustrative embodiments described herein in connection with the drawing figures relate to system and methods for facilitating electronic contracting in the context of indirect financing transactions, such as buying or leasing an automobile offered for sale or lease by an automobile dealership with financing provided by one or more independent finance sources. In some example embodiment, however, the financing may be direct whereby the dealer may act as a finance source when the dealer provides financing for the transaction. Furthermore, example embodiments described herein, are not limited to such automobile retail environments and automobile vehicle financing applications, but may be implemented in myriad other commercial transaction environments and asset financing transactions, including both unsecured and secured credit applications and financing. Furthermore, vehicle financing transactions may involve vehicles other than automobiles (e.g., including cars and trucks), such as boats and other watercraft vehicles, recreational vehicles, motorcycles, off-road vehicles, aircraft and the like.

A financing transaction, as used herein, may be a lease transaction, a loan transaction, or any other transaction in which a finance source provides financing for a party to obtain use of, and possibly also legal title to, an asset, which asset includes, for example, one or more items such as automobiles (e.g., cars, trucks, and the like), marine, recreational vehicles (RV), aircraft, motorcycles, off-road vehicles, consumer goods, real estate, contract rights, intangible property rights, home furnishings, home improvement, office equipment, inventory, manufacturing equipment, livestock, farm equipment, financial interests, and so on. Additionally, the term "acquisition" used in connection with an asset (e.g., an "asset acquisition" or "acquiring an asset") may involve a purchase (i.e., buying or a corresponding sale) or a lease of the asset, and thus a financing transaction relating to an acquisition may be a lease transaction, a loan transaction, or any other transaction in which a finance source provides financing for a party to obtain use of, and possibly also legal title to, the asset.

Additionally, while some example embodiments are described in connection with a transaction involving personal communication (e.g., face-to-face, telephonic, and the like) between a customer and a dealer at a brick-and-mortar dealership, alternative embodiments may be implemented in an e-commerce or online shopping environment (e.g., an online automobile dealer), where a customer may remotely browse an online retailer's website for locating and buying or leasing inventory offered for sale or lease by the online retailer, though such e-commerce or online shopping may also involve some communication between customer and an employee or human agent of the online dealer (e.g., to obtain additional information and/or effect all or part of the transaction). Furthermore, a dealer is not limited to an automobile dealer, but is any individual or entity (e.g., commercial dealership, third party brokers, vendors, retailers, and manufacturers) in the business of selling or leasing assets, including merchandise, to customers, and in doing so may communicate with lenders as well as customers.

A contract, as used herein, may be a document prepared in connection with a transaction for the purchase or financing of a vehicle offered for sale by the dealer with financing provided by a finance source. The contract may include a plurality of document each having various contact provisions, information describing the customer, information describing an automobile, information describing a financing program, and a plurality of signature fields. The contract may be considered executed when it is signed by all contracting parties at the appropriate signature fields. Thus, in one example embodiment, the contract may be executed (e.g., signed) by the customer and the dealer, and then transferred (e.g., assigned) by the dealer to the finance source. In alternative embodiments, the contract may be executed by the customer, the dealer and the finance source. Once executed, the contract becomes a legal instrument that binds the contracting parties to the contract provisions contained therein.

In one example embodiment, the contract may be generated in an electronic form (i.e., electronic contract) and printed by the dealer for review and execution by the contracting parties. The electronic contract may be created as a text document, postscript document, image file or other type of electronic document. The printed copy of the electronic contract may be executed in the following manner. In one example embodiment, a paper copy of the contract may be signed by the contracting parties, the signature may be scanned by a signature capture device and appended to the electronic version of the contract (i.e., electronic contract), as will be described in a greater detail hereinbelow. In alternative example embodiment, an electronic signature pad may be used to sign an electronic version of the contract and the captured electronic signature may be appended to the electronic contract. The captured image of a handwritten signature will be referred to herein as a holographic or electronic signature.

In one example embodiment, the captured holographic signatures of contracting parties may be appended to the electronic contract document. To that end, each captured holographic signature may include signature identification information, such as a contract identifier and a signature identifier. The contract identifier may be a unique number used to associate the captured signature to a specific electronic contract. The signature identifier may be a unique number used to associate the captured signature with a particular signature field within the specific electronic contract. The contract and signature identifiers may be assigned to each newly generated contract. In one example embodiment, contract and signature identifiers may be embedded into the electronic contract. For example, the contract identifier may be placed into the margin of the contract and the signature identifiers may be placed into or next to the associated signature fields. In another example, the contract and signature identifiers may be embedded into the contract document as unique dot patterns, barcodes, numeric sequences and the like, which may be captured by the signature capture device during contract execution.

In one example embodiment, a special digital paper may be used to print contract documents. Digital paper is patterned paper used in conjunction with a signature capture devices, such as a digital pen, to create handwritten digital documents. The printed dot pattern uniquely identifies the position coordinates on the paper. In one example embodiment, a digital paper having Anoto dot pattern may used, such paper is manufactured by a Swidish company Anoto Group AB. The Anoto pattern can be printed onto almost any paper, using a standard printing process of at least 600 dpi resolution and carbon-based black ink or the like. In one example embodiment, the one or more unique dot patterns printed on the paper may be associated with a contract identifier and/or signature identifiers for purpose of identification of captured holographic signatures. In particular, the signature capture device may be used to take photo images of the dot pattern within a signature field and identify location of the captured signature. The location coordinates may then be correlated to the corresponding signature identifier. In this manner, the captured holographic signature may be associated with a particular electronic contract and, more specifically, with a particular signature field within the contract.

FIG. 1 depicts one example embodiment of a system for implementing financing transactions in connection with an acquisition of an asset such as an automobile. System 100 includes automobile dealership computer systems 102a, 102b, 102c, finance source (FS) systems 104a, 104b, 104c, and a credit management system (CMS) 108. Communications between the various dealerships 102, FS systems 104 and CMS system 108 are provided via network 105, which may include any configuration of private and/or public communication networks, packet switched local area networks (LAN) and wide area networks (WAN). In one example embodiment, network 105 includes the Internet or a data communications network providing similar functionality. Dealership, FS systems, and CMS systems may communicate using messaging formats and protocols known in the art, such as XML-based messaging according to STAR (Standards for Technology in Automotive Retail), and the like.

In one example embodiment, FS systems 104 provide processing platforms for processing credit applications for financing (e.g., loans and/or leases) an automobile being offered for sale by a dealer to a customer. Examples of finance sources include Lexus Financial Bank®, BMW Financial Services, General Motors Acceptance Corporation (GMAC®) Financial Services and others. Embodiments of the present invention, however, are not limited to such automobile retail environments and automobile vehicle financing applications, but may be implemented in myriad other commercial transaction environments and asset financing transactions, including both unsecured and secured credit applications and financing. Accordingly, a finance source (also referred to herein as a lender) may be considered as any entity providing financing for asset (e.g., automobiles in an example embodiment of FIG. 1) transactions, e.g., banks and credit unions, manufacturer-related financing companies, financial institutions, and other credit granting institutions.

In one example embodiment, dealerships 102 may be independent automobile dealerships (e.g., separately owned businesses) and, as schematically depicted, each including a computer network comprising one or more computer devices 103 communicably coupled to a Dealer Management System (DMS) 101, which may be operating on one or more servers on the dealership's computer network. As will be understood by those skilled in the art, the illustrative dealership computer devices 103 are not limited to personal computers, terminals, or workstations, nor limited to wired network connections within the dealership, but may include any computing device that may communicably connect (e.g., wirelessly; via a WAN, via a virtual private network (VPN) connection, via the Internet, etc.; via one or more hardware devices, such as routers, switches, hubs, etc.; and using any of a variety of communication protocols; etc.) to the Dealer Management System 101.

As known to those skilled in the art, a typical DMS 101 (e.g., such as provided by ADP, Inc. or Reynolds and Reynolds, Inc.) or similar system stores and manages dealership data such as that related to inventory, sales, parts, service, customers, etc. In use, the DMS 101 allows salespersons, management, and other authorized users to access stored dealership data. For example, a salesperson may access DMS 101 via a computer device (e.g., 103a) to determine whether the dealership has a certain vehicle in its existing inventory. In addition, as will be further understood below, in various embodiments of the invention, a dealer assisting a customer in arranging for financing to complete the automobile transaction (e.g., lease or sale) may use a dealership computer 103 to access the DMS 101 to acquire vehicle information (and possibly also information for a return customer), and may also access (e.g., navigating via a web browser) Credit Management System (CMS) 108 (e.g., which may be a web-based application) to arrange for financing of the vehicle from finance sources 104.

In one example embodiment, the credit management system (CMS) comprises one or more computer servers connected to the communication network 105. CMS system 108 may be provided by an independent application service provider (ASP), though in various embodiments such a system may be provided, for example, by one or more affiliated dealers. In an embodiment of the invention, CMS 108 is operable to assist automobile dealers in obtaining automobile financing for customers from disparate finance sources 104. To that end, CMS 108 maintains secure, separate accounts for each independent dealership participant (e.g., subscriber) of the credit management system, which automobile dealer may access via communication network 105 (e.g., via a secure (e.g., encrypted) communication link). As indicated above, while CMS computer system 108 is depicted as a computer server 108, generally, CMS 108 may be implemented as, or be part of, a multi-server environment having access to multiple databases to provide such a platform (e.g., including geographically dispersed servers to provide service to geographically dispersed dealers).

To facilitate electronic execution of indirect financing transactions between customers and various finance sources, CMS 108 comprises a credit aggregation management system (CAMS) 110 and a database 114 in accordance with one example embodiment. CAMS 110 may be implemented as a web-based application, providing independent dealerships (e.g. 102a, 102b, 102c) a common platform for electronically submitting automobile financing applications to one or more finance sources (e.g., finance sources 104a, 104b, 104c) with which they do business. Although CAMS 110 is illustrated as being hosted by the web server 108, system 110 may reside in other locations in the system 100. In some example embodiments, one or more of these modules, or portions thereof, may be incorporated into a dealership's local DMS (e.g., DMS 101a). Additionally, in various embodiments, DMS 101, or portions thereof, may be implemented as a web-based service, similar to CMS 108, and in some implementations such a web-based DMS system, or portions thereof, may be bundled or included with, or otherwise operate as part of, the web-based CMS 108. In short, the particular details of the system 100 may vary depending upon the particular application or embodiment thereof.

Figure 2:
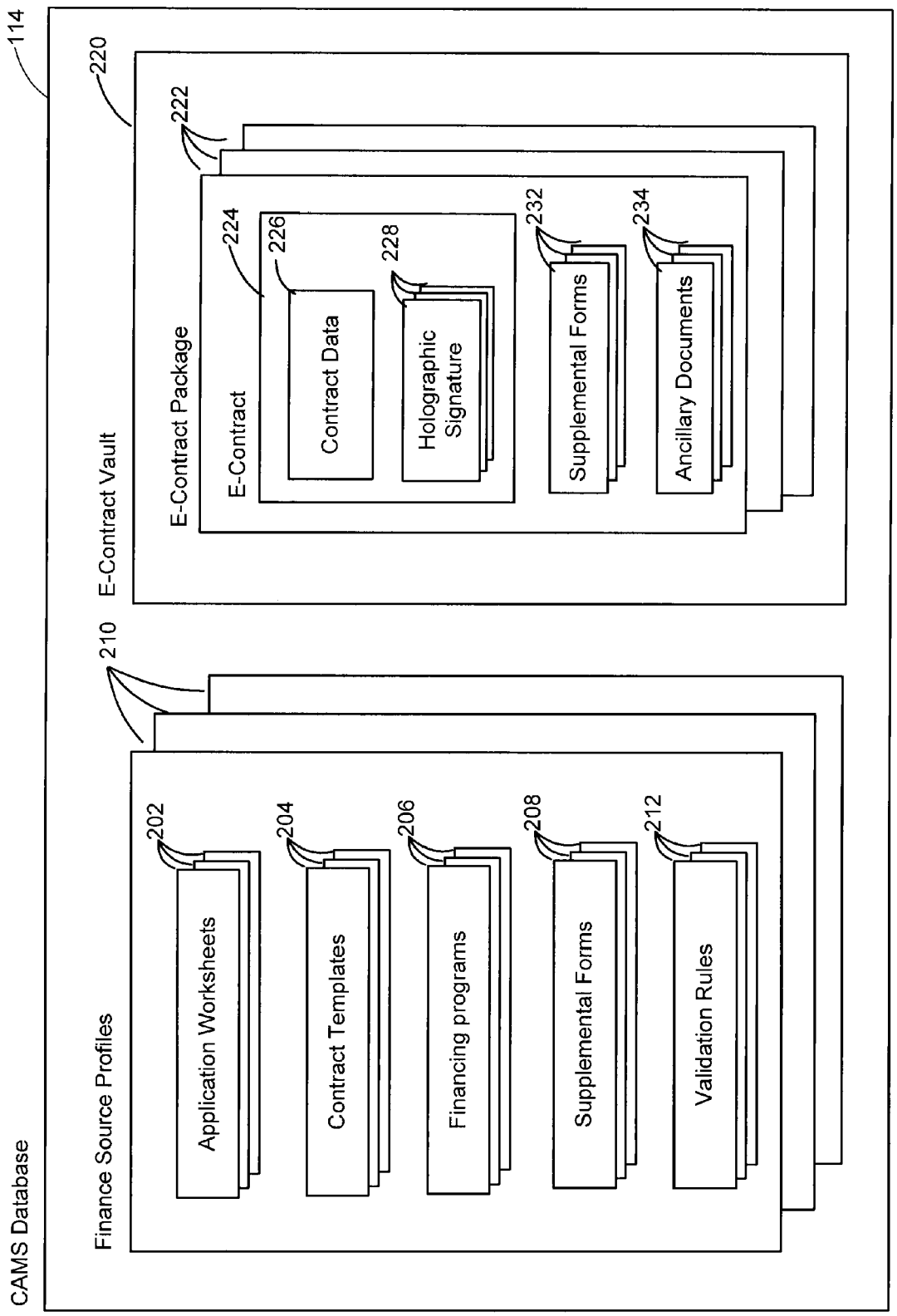
FIG. 2 is a schematic diagram illustrating one example embodiment of a database for a credit aggregation management system.

In one example embodiment, CAMS 110 facilitates collection of information about available automobile financing programs from FS systems 104. FIG. 2 is a schematic diagram illustrating one example embodiment of a database 114 for a credit aggregation management system 110. As depicted, the collected information may be stored in the finance source (FS) profiles 210. In some embodiments, finance source profile information stored in FS profiles 210 may include, but is not limited to, application worksheets 202, which may include applicant worksheets for collecting personal information about the customer and deal worksheets for collecting financial information and vehicle information. FS profiles 210 may also include financing programs information 206, which may include information on the term of available loan and lease programs, including their amortization and interest rates and other financial information. FS profiles 210 may also store supplemental forms 208, which may include retail loan agreements, lease agreements and other financial forms, that may be provided to the customer in connection with the financing of the vehicle. FS profiles 210 may also include various application validation rules 212, which may be used to check validity of application data entered by the dealer before it is being submitted to the finance source for approval. FS profiles 210 may also include contract templates 204, which are used to generate electronic contracts based on approved credit application data. Various example embodiments of the configuration and operation of CAMS 110 are described in a commonly owned U.S. patent application Ser. No. 12/006,016, entitled "System and Method for Electronic Contracting", which is incorporated by reference herein in its entirety.

To facilitate storage of executed electronic contracts, CAMS database 114 further includes an e-contract vault 220 according to one example embodiment. Vault 220 is configured to store a plurality of electronic contract packages 222. Each package may include the original electronic contract 224, supplemental forms 232 and various ancillary documents 234, such as co-buyers agreement, insurance verification, service contract, GAP waiver, odometer statement, vehicle title, after market products and state-specific forms and others. Each electronic contract 224 may include a text document, postscript document, image file or other type of electronic document. In addition, each electronic contract 224 may include one or more holographic signatures 228, which indicate execution of the contract by the contracting parties. The holographic signatures 228 may include customer signature, dealers signature and finance source representative's signature. A holographic signature 228 may be a photo image of the original signature captured during contract execution by the signature capture devices 115, as will be described in a greater detail hereinbelow. Each holographic signature 228 may include signature information (not shown) associating each signature to one or more signature fields within the contract 226. Such information may include a signature identifier associated with one or more signature fields. In one example embodiment, each e-contract package 222 may be signed with a digital signature to indicate authenticity of the contents of each EC package 222.

A digital signature is data that binds a user's identity to the information being stored. A digital signature may be bundled with any message, file, or other digitally encoded information, or transmitted separately. Digital signatures are used in public key environments and provide authentication and integrity services. A digital certificate is a digitally signed statement that contains information about an entity and the entity's public key, thus binding these two pieces of information together. A certificate may be issued by a trusted organization (or entity) called a certification authority (CA) after the CA has verified that the entity is who it says it is. Certificates can contain different types of data. For example, it can include the format of the certificate, the serial number of the certificate, the algorithm used to sign the certificate, the name of the CA that issued the certificate, the name and public key of the entity requesting the certificate, and the CA's signature. In one example embodiment, CMS 108 may use an independent digital certificate vendor, such as VeriSign Inc. or a similar vendor, to issue the certificates used in storage of electronic contracts.

In one example embodiment, CAMS 110 further comprises an e-contracting application 112, which includes program logic for facilitating electronic creation of credit applications, execution of e-contracts based on applications approved by finance sources 104, and storage and maintenance of executed e-contracts in e-contract vault 220 in the database 114. E-contracting application 112 may be implemented as an internal software component of CAMS 110, though as will be understood by those skilled in the art, the e-contracting functionality may be provided as a separate application running on the same or different server as the CAMS 110. In one example embodiment, e-contracting application 112 may have a user interface, such as a HTML-based graphical user interfaces, accessible to the dealers and finance source representatives through the communication network 105. The interfaces facilitate execution of various electronic contracts. In addition, e-contracting application 112 may be configured to communicate with the signature capture devices 115 to facilitate collection of signature related information, as will be described in a greater detail hereinbelow. Operation of the e-contracting application 112 will be described hereinbelow with reference to FIGS. 4, 5 and 6.

To facilitate execution of financing contacts, the system 100 further includes a plurality of electronic signature capture devices 115 in accordance with one example embodiment. As depicted in FIG. 1, signature capture devices 115 may be provided to the dealers and finance sources or other parties involved in execution of the vehicle financing contracts. Signature capture devices 115 may be connected to the dealers' PCs and may be used to capture both the customers' and the dealers' electronic holographic signatures during execution of printed contract documents or electronic contracts. Signature capture devices 115 may be also configured to capture signature related information, such as contract identifier and one or more signature identifiers embedded in the printed contract documents, as will be described in a greater detail hereinbelow. Signature capture devices 115 are may be configured to transmit the captured signature information to the e-contracting application 112 through the communication network 105. In one example embodiments, capture devices 115 may include digital pens, such as AutoPen® manufactured by Coin Data LLC of Norcross, Ga. In another embodiment, the signature capture device may include a handwriting signature pad, such as signature pads manufactured by Coin Data LLC.

Figure 3C:
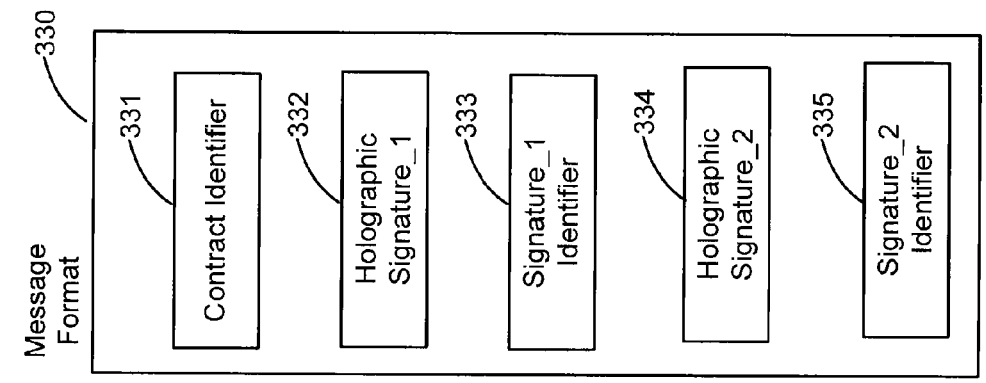
FIGS. 3A, B and C are schematic diagrams illustrating one example embodiment of a signature capture device and message format for communication of signature information.
Figure 3B:
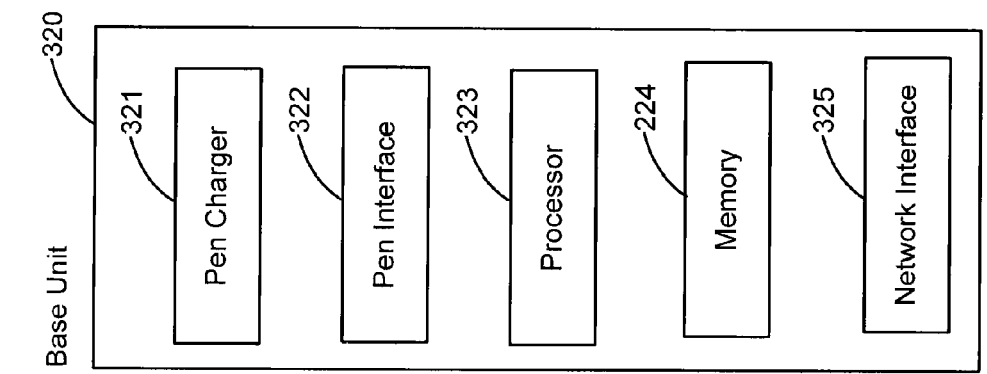
Figure 3A:
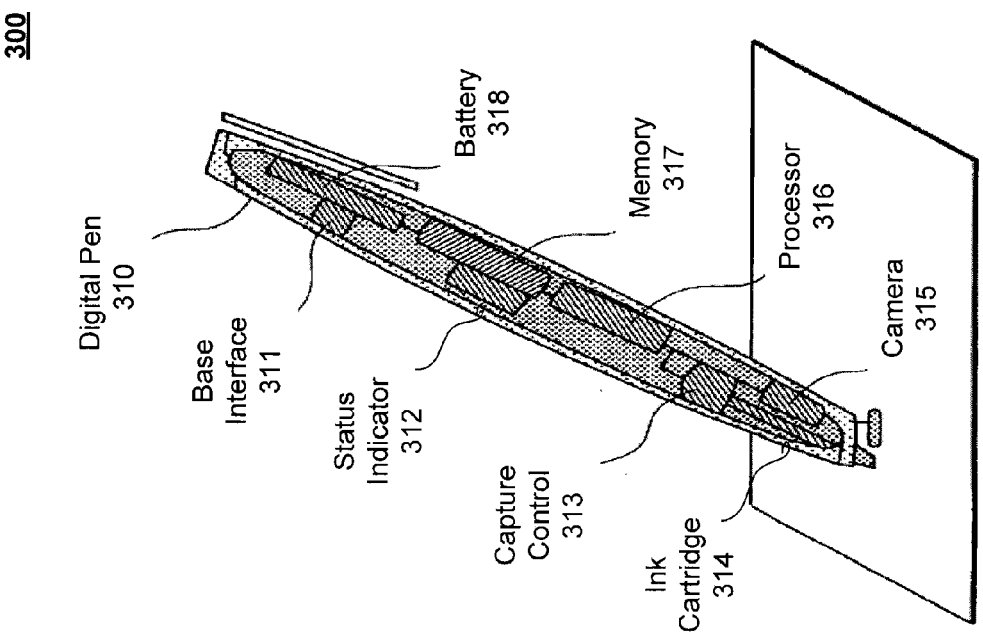

One example embodiment of the electronic signature capture device is depicted in FIGS. 3A and 3B. Device 300 includes a writing instrument 310, such as a digital pen, and a pen base unit 320. In one example embodiment, digital pen 310 may include a base unit interface 311, such as a Bluetooth interface, USB interface or other types of wireless, wired or contact-type data transfer device. Digital pen 310 may further include a status indicator 312, which may use different color LEDs or an LCD display to indicate the status of the pen, such as charging, capturing data, transferring data, low battery, or other status indicators. Pen 310 may further include a capture control 313, which indicates when to initiated and/or terminated image capture. In one example embodiment, the capture control 313 may be a pressure sensor, which detects when the tip of the pen is in contact with the item being signed. In another example embodiment, capture control 313 may be a button activated by the pen user. Digital pen 310 may also include an ink cartridge 314, such as a ballpoint type ink cartridge.

In one example embodiment, pen 310 may also includes a camera 315 for capturing signature images, i.e., holographic signatures, of the signing parties as well as signature related information. The camera 315 may be a charge-coupled device (CCD) camera, a CMOS imager or other type of image capture device. Digital pen 310 may further include a processor 316, such as a microcontroller, a field programmable gate arrays (FPGAs), an application specific integrated circuit (ASIC) or the like. Processor 316 is configured to control the capture and processing of digital images, transfer of captured images to the base unit 320 through interface 311, operation of the status indicators 312 and other functions of the pen. Digital pen 310 further includes a memory 317 for storing captured signature images and signature-related data, such contract and signature identifiers. The capture images may be stored in a JPEG, GIF, Windows® bitmap or other file formats. Memory 317 may include Flash memory or other types of electrically erasable programmable read only memory (EEPROM). Pen 310 may also include a rechargeable battery 318, such as a lithium battery, for powering various electronic components of the pen. Battery 318 may be recharged when the pen is docked in base unit 320. Digital pen 310 may include other components known to those of skill in the art.

FIG. 3B depicts one example embodiment of the base unit 320 of the digital pen 310. Base unit 320 is configured to house the digital pen 310 when the pen is not in use and to provide communication between the digital pen and dealer's or finance source's PC. In one example embodiment, base unit 320 includes a charger 321, which recharges the battery 318 of the digital pen 310. Base unit 320 may also include a pen interface 322 configured to communicate with interface 311 of the digital pen 310. In various example embodiments, interface 322 may be a Bluetooth interface, USB interface or other types of wireless, wired or contact-type data transfer device. Base unit 320 may also include a processor 323 configured to control various components of the base unit 320 and retrieve captured signature related information from the memory 317 of the digital pen 310. Processor 323 may store the retrieved signature information in memory 324. Base unit 320 also includes a network interface, such as an Ethernet, WiFi or other type of wired or wireless network interface, which facilitates transfer of data from base unit 320 to dealer's or finance source's PC, and, in particular, to the instance of e-contracting application 112 running on the computer to which base unit 320 is connected.

FIG. 3C depicts one example embodiment of the message format used to transfer data between base unit 320 and e-contracting component 112 in CAMS 110. In one example embodiment, the data may be transferred using XML-based message over a TCP/IP connection established between base unit 320 and e-contracting application 112 running on CAMS 110. The message may include a plurality of data fields, which include, but are not limited to, contract identifier 331, holographic signature_1 image 332, signature_1 identifier 333, holographic signature_2 image 334, signature_2 identifier 335 and other data fields. The format and content of the messages may vary based on application requirements, system configuration, network protocol specification and other factors know to those of skill in the art. In one example embodiment, messages 330 may be encrypted using known symmetric or asymmetric encryption techniques, such as block cipher, public key encryption or other techniques. The e-contracting component 112 may be configured to decrypt the received messages 330, retrieve signature information contained therein and process the retrieved information as will be described below.

Figure 4:
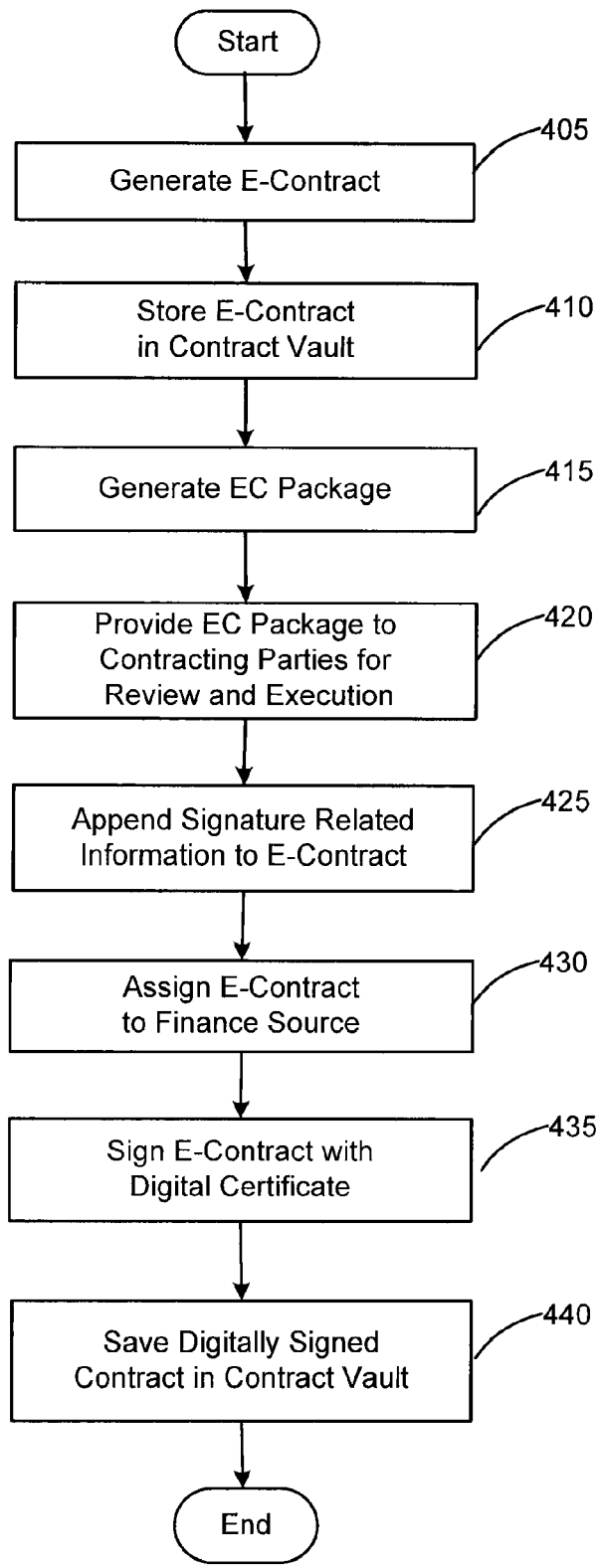
FIG. 4 is a flow diagrams illustrating one example embodiment of a process of electronic contracting.

FIG. 4 depict one example embodiment of a process for electronic contracting in indirect financing transactions in which a customer may acquire an asset (such as, for example, an automobile) from a dealer or other vendor with financing for the transaction provided by an independent finance source. At step 405, e-contracting application 112 generates an electronic contract for vehicle financing. Several example embodiments of contract generation process are described in a commonly owned U.S. patent application Ser. No. 12/002,016, filed on Dec. 14, 2007, entitled "System and Method for Electronic Contracting", which is incorporated by reference herein in its entirety. In one example embodiment, e-contracting application 112 may assign a unique contract identifier to the newly created contract. This contract identifier may be used to identify and properly route the data in all communications and messaging that may occur between CMS 108, dealership computer systems 102 and finance source systems 104 in connection with execution of this electronic contract.

Figure 6:
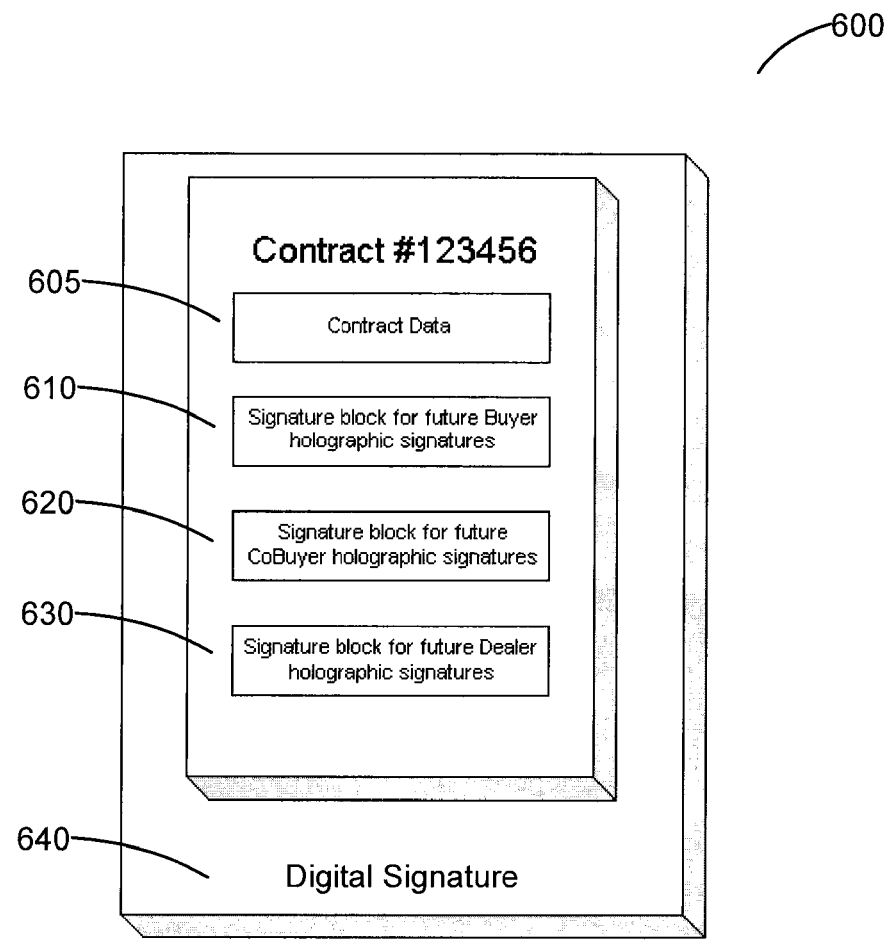
FIG. 6 is a schematic diagrams illustrating one example embodiment of data structures for storing an electronic contract.

In one example embodiment, e-contracting application 112 may store a newly created (unexecuted) contract in a contract vault 220, step 410. One example embodiment, of a structure for storing a newly created e-contract is depicted in FIG. 6. As shown, data structure 600 may include an e-contract 405 and a plurality of signature blocks 610-630, where holographic signatures of contracting parties may be inserted once the contract is executed. When an e-contract 605 is first created in the contract vault 220 it may be secured with a digital signature 640, as will be described in a greater detail herein below. In one example embodiment, e-contracting application 112 may assign a transaction number or other identifier to each new contract created in contract vault 220. The transaction number or other identifier may be used as the primary key in storing contract documents in the contract vault 220. In one example embodiment, the transaction number may be the same as contract identifier described above. In another example, embodiment the transaction may be different from the contract identifier Next, e-contracting application 112 may generate an EC Package by systematically merging the electronic contract with various supplemental forms and ancillary documents, step 415. Each finance source may be responsible for creating its own supplemental forms and ancillary documents and ensuring that each is accurate and compliant with all applicable local, state and federal laws and regulations. E-contracting application 112 may access these forms from FS profiles 210. For each applicable deal type, the finance source may identify the contract forms and other supplemental forms to be used. For example, the deal type may be determined based on the six deal type parameters selected by the dealer: finance source, application type (e.g., individual, individual with co-buyer), transaction type (e.g., retail), product type (e.g., simple interest, actuarial), state, and sale class (e.g., new, used). The supplemental forms may be customized based on the collected customer data, such as with the customer's name, address etc. Each contract form may explicitly indicate that the customer is agreeing to conduct the transaction electronically and agreeing to use electronic records and electronic signatures to document the contract. The dealer may also ask the customer to provide various ancillary documents, which may then be faxed or transmitted to CMS 108 using mail or other means. The received documents are then appended to e-contract.

Next, e-contracting application 112 may provide the dealer with a copy of the EC package documents for review and execution by the contracting parties, step 420. To that end, e-contracting application 112 may extract from the contract vault 220 and/or FS profiles 210 a copy of the forms and documents making up the EC package 222. E-contracting application 112 may render each document and present it to the dealer in the electronic form. The dealer may then print all documents constituting the EC package 222, including the electronic contract 224, supplemental forms 232 and ancillary documents 234. In one example embodiment, before or during printing of these documents, e-contracting application 112 may embed the contract identifier and various signature identifiers into the contract document and other documents and forms. For example, the contract identifier may be placed into the margin of the contract and the signature identifiers may be placed into or next to the associated signature fields. In another example, the contract and signature identifiers may be embedded into the contract document as unique dot patterns, barcodes, numeric sequences or in other graphic or numeric formats. The contract package is then reviewed and executed by the contracting parties. One example embodiment of a contract execution process is described herein below with reference to FIG. 5.

Once electronic contract is executed by all contracting parties, e-contracting application 112 is configured to collect captured holographic signatures of the contracting parties, so that they can be appended to the electronic contract stored in the in the vault 220, step 425. In one example embodiment, e-contracting application 112 may use signature identification information, such as contract identifier and signature identifiers, provided along with the holographic signatures to associate each holographic signature to the pre-designated line on the e-contract in the vault 220. The signatures may be affixed in such a way that the date and time of each signature capture, as well as the authenticity of each unique signature is embedded in the e-contract. At this point, the dealer is able to save and exit the contract generation process if necessary in order to return at a later time for the remaining party(s) to complete all required signatures. After all required signatures have been obtained, e-contracting application 112 may update the electronic contract from a signatures-in-process status to an Authoritative Copy (AC).

Once the AC of the e-contract has been created, the dealer may assign and distribute the electronic contract to the finance source, step 430. To that end, the dealer may invoke the "Assign Contract" function provided by e-contracting application 112. The system will display the finance source as the assignee to which the contract will be sent, and state that by clicking the "Assign" button the dealer is assigning the contract to the finance source under the terms and conditions of the dealer agreement governing such assignments. Once this is completed, the e-contracting application will enable the "Distribute" function to the dealer. The offer and acceptance of such assignment shall be affected electronically and recorded by the e-contracting application 112. After the contract assignment is accepted by the finance source, the ownership logs will be updated and the finance source will become the assignee of record.

E-contracting application 112 may then permanently seal the electronic contract using a designated digital certificate that is reserved solely for signing the Authoritative Copy of a contract, step 435. The presence of this digital certificate, as obtainable through the digital signature, will identify it as the Authoritative Copy. Upon saving the Authoritative Copy in the contract vault 220, step 440, the e-contracting application 112 may update contract ownership logs (not depicted) with the dealer ownership information. E-contracting application 112 may enable the dealer to print the entire signed electronic contract package once all required signatures have been affixed thereto. The printed contract documents may be marked in the margin(s) as a non-authoritative copy. It is the dealer's responsibility to ensure that the customer is provided with a printed copy of the signed EC package before leaving the dealership.

Figure 5:
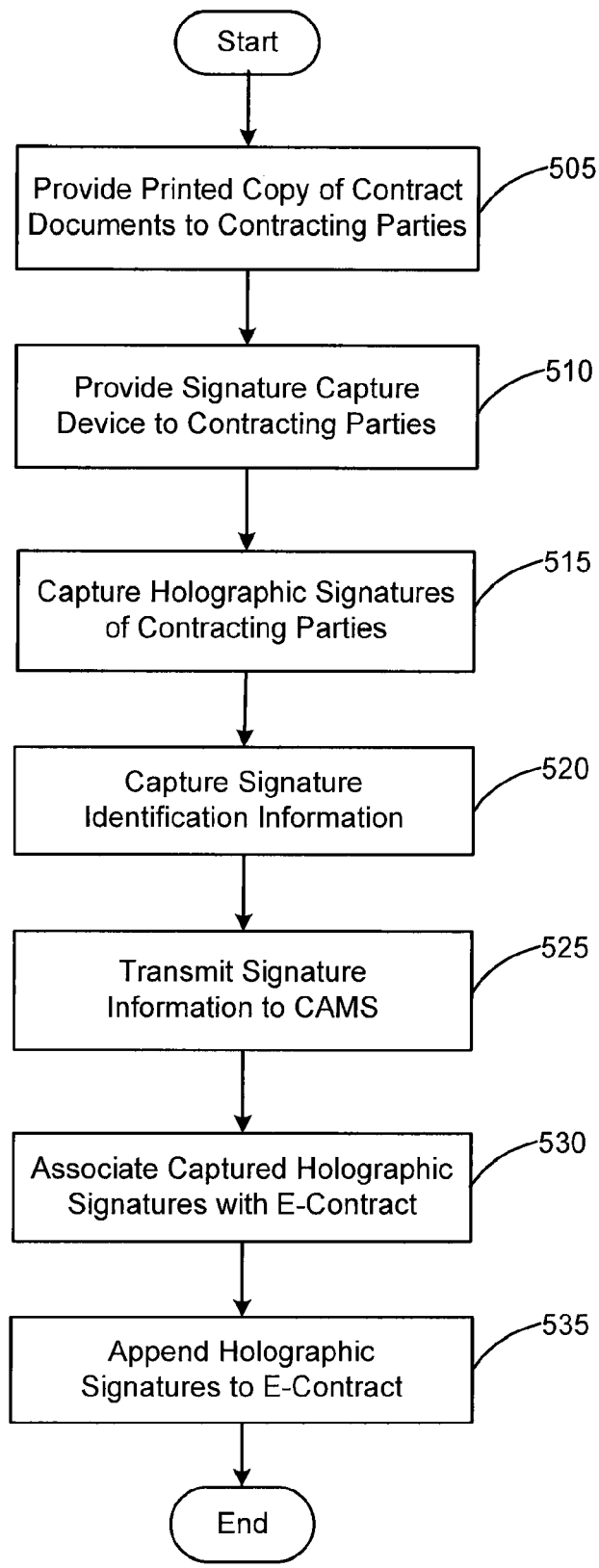
FIG. 5 is a flow diagram illustrating one example embodiment of a process of contract execution.

FIG. 5 depicts one example embodiment of a process for contract execution. As indicated above, the dealer may initiate the contract execution process by retrieving a copy of the EC package from the contract vault via user interface of the e-contracting application. The dealer may then print all documents in the EC package and provide them to the customer for review, step 505. In one example embodiment, the contract may be printed on a digital paper, as described above. In another example embodiment, contract identification information, such as contract identifier and one or more signature identifiers, may be embedded in the designated locations in the printed contract document. For example, the contract identifier may be placed in the margin of the contract and the signature identifiers may be placed into or next to the associated signature fields. In another example, the contract and signature identifiers may be embedded into the contract document as unique dot patterns, barcodes or numeric sequences.

The dealer may then provide a signature capture device to the customer, step 510. In one example embodiment, the signature capture device may be a digital pen. When the user uses the pen to sign paper copy of the contract, the pen is configured to capture a handwritten signature of the contracting party, step 515. For example, the digital pen may take one or more digital photographs of the handwritten signature and save them as a holographic signature. In case the signature field also includes a signature identifier embedded therein in the form of a dot pattern, barcode or numeric sequence, the digital pen also captures the image of the embedded signature identifier and stores it along with the corresponding holographic signature, step 520. In addition, the pen may be used to capture contract identifier, which may be located in a margin of the document or as a barcode to be scanned by the pen. Furthermore, the pen may record the date and time when the signature was captured. In case the contract is printed on the digital paper, the pen may be configured to captures signature location information encoded in the printed dot pattern. The captured location information may be associated with appropriate contract and signature identifiers.

When the digital pen in docked in the base unit, the captured holographic signatures and signature identification information may be transferred to the e-contracting application for processing, step 525. The e-contracting application uses signature identification information, and, in particular, the captured contract identifier to locate in the contract vault an electronic contract associated with the captured holographic signatures. Once such contract is located, the e-contracting application determines based on the signature identifiers, which captured holographic signatures are associated with which contract signature fields, step 530. Once signature/field associations are established, the e-contracting application may append captured holographic signatures of contracting parties to the e-contract document in the EC package in the contract vault, step 535. The e-contracting application may then permanently seal the electronic contract as Authoritative Copy using a designated digital certificate.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for creating and storing an executed electronic contract, the method comprising:
    generating, by a credit management computer system, an electronic contract including a plurality of signature fields;
    assigning, by the credit management computer system, a contract identifier to the electronic contract and embedding the contract identifier into the electronic contract as one or more of a dot pattern and a barcode;
    assigning, by the credit management computer system, a unique signature identifier to each of the plurality of signature fields and embedding each of the plurality of unique signature identifiers into the electronic contract as one or more of a dot pattern and a barcode;
    providing a copy of the electronic contract, via the credit management computer system, to contracting parties the contracting parties including a customer, a vendor, and a finance source representative, wherein the provided copy is printed for execution by the contracting parties;
    receiving, from a vendor signature capture device, (i) a customer holographic signature, captured during execution of a printed copy by the customer, (ii) an image of the embedded unique signature identifier assigned to the customer-executed signature field, and (iii) an image of the embedded contract identifier;
    receiving, from the vendor signature capture device, (i) a vendor holographic signature, captured during execution of a printed copy by the vendor, (ii) an image of the embedded unique signature identifier assigned to the vendor-executed signature field, and (iii) an image of the embedded contract identifier;
    receiving, from a finance source signature capture device, (i) a finance source representative holographic signature captured during execution of a printed copy by the finance source representative, (ii) an image of the embedded unique signature identifier assigned to the finance source representative-executed signature field, and (iii) an image of the embedded contract identifier;
    identifying, by the credit management computer system, the electronic contract associated with the received customer holographic signature, vendor holographic signature, and finance source representative holographic signature using the contract identifier of each image received with each respective holographic signature;
    associating, by the credit management computer system, the received customer holographic signature with a particular signature field of the identified electronic contract, which corresponds to the customer-executed signature field, using the unique signature identifier of the image received with the customer holographic signature;
    associating, by the credit management computer system, the received vendor holographic signature with a particular signature field of the identified electronic contract, which corresponds to the vendor-executed signature field, using the unique signature identifier of the image received with the vendor holographic signature;
    associating, by the credit management computer system, the received finance source representative holographic signature with a particular signature field of the identified electronic contract, which corresponds to the finance source representative-executed signature field, using the unique signature identifier of the image received with the finance source representative holographic signature;
    creating an authoritative copy of the electronic contract, via the credit management computer system, by affixing (i) the received customer holographic signature in its associated particular signature field, (ii) the received vendor holographic signature in its associated particular signature field, and (iii) the received finance source representative holographic signature in its associated particular signature field of the identified electronic contract, said authoritative copy binding the contracting parties to the provisions of the electronic contract; and
    saving the authoritative copy in a database of the credit management computer system.

2. The method of claim 1, further comprising: generating an electronic contract package including the authoritative copy and digitally signing the electronic contract package with one or more digital signatures.

3. The method of claim 2, further comprising: storing the digitally signed electronic contract package and one or more digital certificates associated with the one or more digital signatures in the database.

4. The method of claim 1, further comprising: providing the vendor signature capture devices to the vendor and the finance source signature capture device to the finance source.

5. The method of claim 4, wherein both the vendor signature capture devices and the finance source signature capture device include a writing instrument having:
    a digital camera configured to capture one or more holographic signatures,
    a memory configured to store the one or more captured holographic signatures, and
    a transmitter configured to transmit the one or more stored holographic signatures to the credit management computer system.

6. The method of claim 1, wherein the received customer holographic signature, the received vendor holographic signature, and the received finance source representative holographic signature comprise a digital photograph of the customer's handwritten signature, the vendor's handwritten signature, and the finance source representative's handwritten signature respectively.

7. The method of claim 1, wherein each of the plurality of unique signature identifiers identifies a designated location in the electronic contract.

8. The method of claim 1, further comprising receiving, from the vendor signature capture device, a date and time of capture of the customer holographic signatures and the vendor holographic signature, and receiving, from the finance source signature capture device, a date and time of capture of the finance source representative holographic signature.

9. The method of claim 8, further comprising embedding in the identified electronic contact each received date and time with each respective affixed holographic signature.

10. A system for creating and storing an executed electronic contract, the system comprising:
    a credit management computer system including a database and a credit aggregation management system;

a plurality of vendor computer systems, each of said plurality of vendor computer systems including a vendor signature capture device;
a plurality of finance source computer systems, each of said plurality of finance source computer systems including a finance source signature capture device;
a communication network connecting said credit management computer system, said plurality of vendor computer systems and said plurality of finance source computer systems;
wherein said credit aggregation management system comprises an e-contracting application configured to:
  generate an electronic contract including a plurality of signature fields;
  assign a contract identifier to the electronic contract and embed the contract identifier into the electronic contract as one or more of a dot pattern and a barcode;
  assign a unique signature identifier to each of the plurality of signature fields and embed each of the plurality of unique signature identifiers into the electronic contract as one or more of a dot pattern and a barcode;
  provide a copy of the electronic contract to contracting parties, the contracting parties including a customer, a vendor, and a finance source representative, wherein the provided copy is printed for execution by the contracting parties;
  receive, from a vendor signature capture device, (i) a customer holographic signature, captured during execution of a printed copy by the customer, (ii) an image of the embedded unique signature identifier assigned to the customer-executed signature field, and (iii) an image of the embedded contract identifier;
  receive, from the vendor signature capture device, (i) a vendor holographic signature, captured during execution of a printed copy by the vendor, (ii) an image of the embedded unique signature identifier assigned to the vendor-executed signature field, and (iii) an image of the embedded contract identifier;
  receive, from a finance source signature capture device, (i) a finance source representative holographic signature captured during execution of a printed copy by the finance source representative, (ii) an image of the embedded unique signature identifier assigned to the finance source representative-executed signature field, and (iii) an image of the embedded contract identifier;
  identify the electronic contract associated with the received customer holographic signature, vendor holographic signature, and finance source representative holographic signature using the contract identifier of each image received with each respective holographic signature;
  associate the received customer holographic signature with a particular signature field of the identified electronic contract, which corresponds to the customer-executed signature field, using the unique signature identifier of the image received with the customer holographic signature;
  associate, by the credit management computer system, the received vendor holographic signature with a particular signature field of the identified electronic contract, which corresponds to the vendor-executed signature field, using the unique signature identifier of the image received with the vendor holographic signature;
  associate, by the credit management computer system, the received finance source representative holographic signature with a particular signature field of the identified electronic contract, which corresponds to the finance source representative-executed signature field, using the unique signature identifier of the image received with the finance source representative holographic signature;
  create an authoritative copy of the electronic contract by affixing (i) the received customer holographic signature in its associated particular signature field, (ii) the received vendor holographic signature in its associated particular signature field, and (iii) the received finance source representative holographic signature in its associated particular signature field of the identified electronic contract, said authoritative copy binding the contracting parties to the provisions of the electronic contract; and
  save the authoritative copy in the database of the credit management computer system.

11. The system of claim 10, wherein the e-contracting application is further configured to:
  generate an electronic contract package including the authoritative copy and digitally sign the electronic contract package with one or more digital signatures.

12. The system of claim 11, wherein the e-contracting application is further configured to:
  store the digitally signed electronic contract package and one or more digital certificates associated with the one or more digital signatures in the database.

13. The system of claim 10, wherein both the vendor signature capture device and the finance source signature capture device includes a writing instrument having:
  a digital camera configured to capture one or more holographic signatures,
  a memory configured to store the one or more captured holographic signatures, and
  a transmitter configured to transmit the one or more stored holographic signatures to the credit management computer system.

* * * * *